Feb. 2, 1926. 1,571,392
G. W. BROTHERTON ET AL
RAT TRAP
Filed July 3, 1924 2 Sheets-Sheet 2
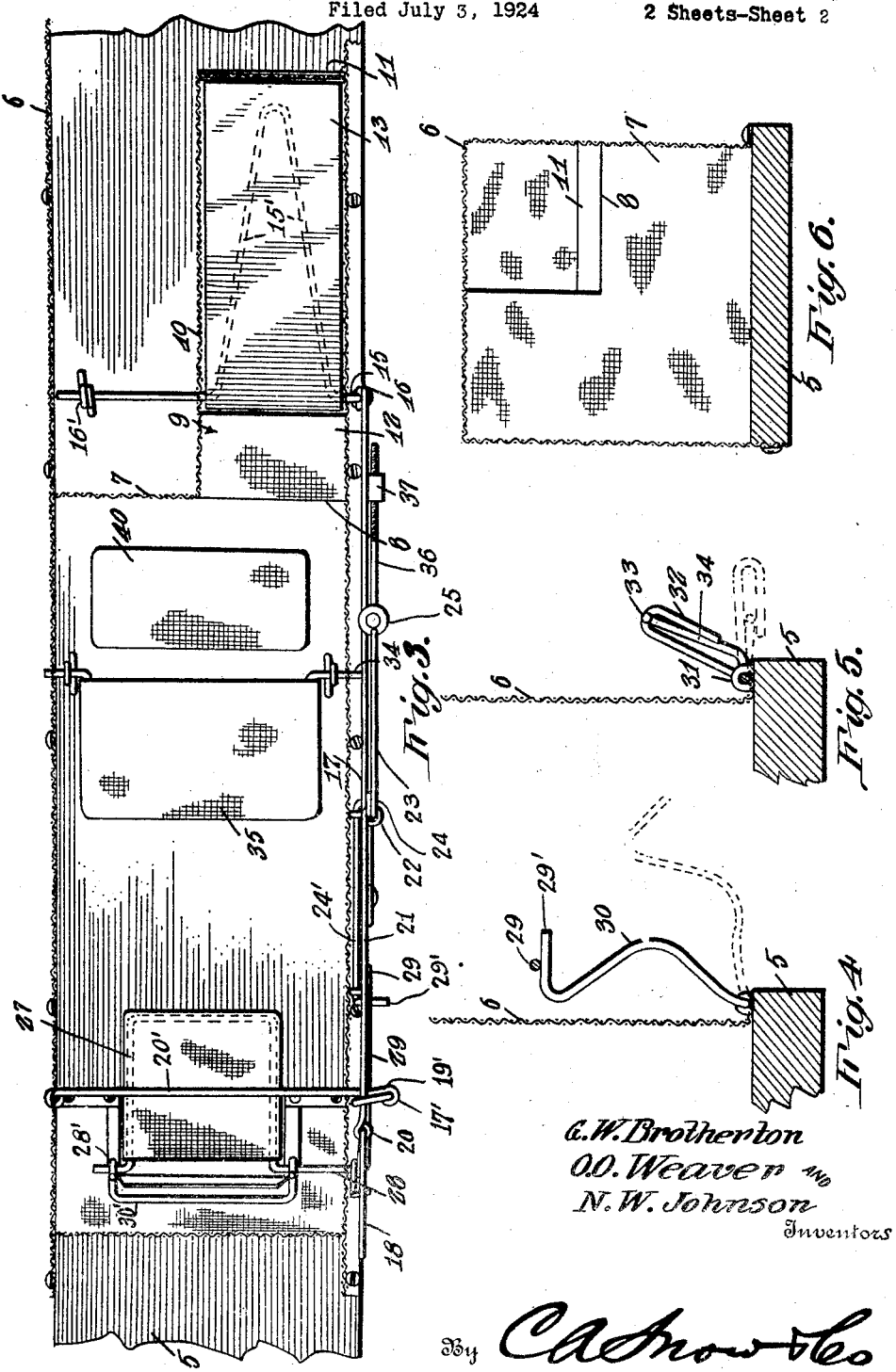
G. W. Brotherton
O. O. Weaver
N. W. Johnson
Inventors
By C. A. Snow & Co.
Attorneys.

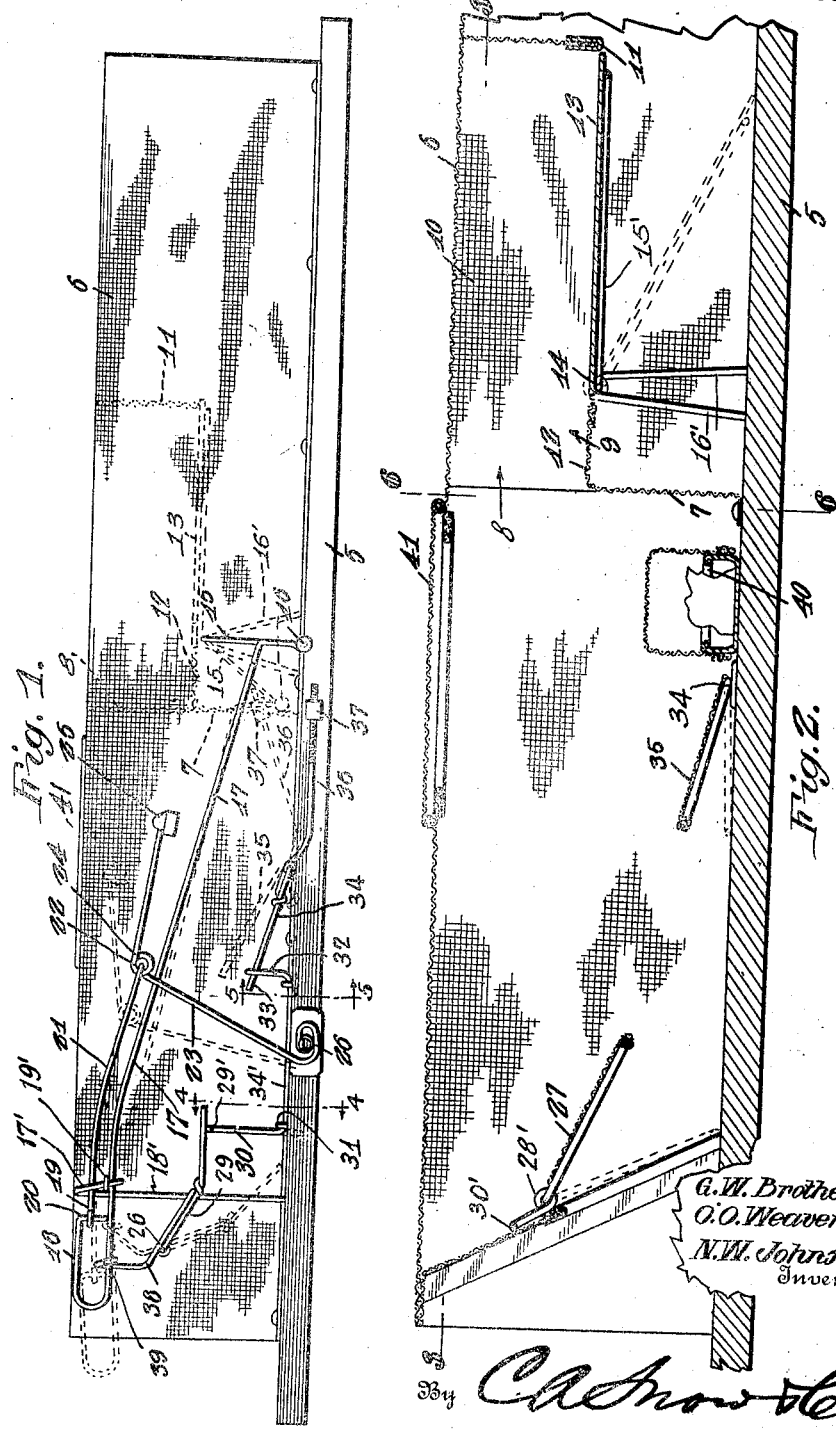

Patented Feb. 2, 1926.

1,571,392

UNITED STATES PATENT OFFICE.

GEORGE W. BROTHERTON, ORLIE O. WEAVER, AND NATHAN W. JOHNSON, OF HARTFORD CITY, INDIANA.

RAT TRAP.

Application filed July 3, 1924. Serial No. 724,041.

*To all whom it may concern:*

Be it known that we, GEORGE W. BROTHERTON, ORLIE O. WEAVER, and NATHAN W. JOHNSON, citizens of the United States, residing at Hartford City, in the county of Blackford and State of Indiana, have invented a new and useful Rat Trap, of which the following is a specification.

The present invention relates to traps and more particularly to an everset trap especially designed for catching rats, mice or the like.

An important object of the invention is to provide a device of this character wherein the closure at the entrance of the trap will be automatically closed as a rodent passes to the bait receptacle, to prevent the escape of the rodent by way of the entrance opening.

Another object of the invention is to provide means automatically actuated by the weight of the rodent caught in the trap, for moving the closure at the entrance end of the trap to its open position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a trap constructed in accordance with the invention.

Figure 2 is a longitudinal sectional view through the trap.

Figure 3 is a sectional view taken on line 3—3 of Figure 2.

Figure 4 is a fragmental elevational view disclosing the means for holding the closure at the entrance end of the trap in its open position.

Figure 5 is a fragmental elevational view disclosing the connection between the weighted latch controlling arm and latch member.

Figure 6 is a sectional view taken on line 6—6 of Figure 2.

Referring to the drawing in detail, the reference character 5 designates the base of the trap to which the body portion 6 is secured, which body portion is constructed preferably of wire mesh material, and as shown, is preferably elongated.

The body portion is divided at a point substantially intermediate its ends by means of the partitioning walls 7, which wall is provided with an opening 8 establishing communication between the front section of the trap or front compartment formed by the wall 7 and the compartment 9 formed by the wall 10, end wall 11 and bottom wall 12, the bottom wall 12 being cut away as clearly shown by Figure 2 of the drawings.

The cut away portion of the bottom wall 12 is normally closed by means of the trap door 13, which is hingedly connected at 14 to the walls of the compartment 9. The door 13 is secured to the rod 15, which is bent at 15′ to underlie the trap door and support the same. The rod 15 is supported in bearings formed at the upper ends of the leg members 16′. One end of the rod 15 extends downwardly from its pivot point where it has connection with rod 17, by means of rod 16 the upper end of the rod 17 being formed into an elongated eye 18, the extreme end of the rod 17 extending downwardly as at 19 where it extends through the eye 20 of the rod 21. The rod 17 passes through the loop 17′ of the supporting wire 18′ positioned adjacent to the entrance end of the trap. Connected with this supporting wire 18′ at 19′ is a spacing wire 20′ that extends across the trap and acts to hold rods 17 and 21 in spaced relation. Formed at the opposite end of the rod 21 is an eye 22 that has connection with the rod 23 through the loop portion 24 thereof. One end of the rod 23 extends rearwardly and terminates in spaced relation with the eye 22 where it supports a weight 25 which weight is arranged to normally draw the elongated eye 18 towards the center of the trap.

The rod 23 has its lower end bent around the pin 26 in such a manner that the rod 23 may swing freely on its support.

Operating at the entrance end of the trap, is a hinged closure 27 mounted on the rod 28 supported in bearings 28′ formed at the ends of the rod 30′ which is secured to the front wall of the trap and as shown, the rod extends through the body 6 and is bent at right angles to provide an arm 29 that extends downwardly and inwardly and normally engages the right angled end 29' of the latch member 30 formed at one end of the rod 34' that is pivotally supported by means of the eyes 31. One end of the rod 34' is bent into an eye 32 designed to receive the end 33 of the rod 34 that provides a support for the treadle 35 which normally lies in a position as is shown by Figure 2 of the drawings, but when actuated will move downwardly into engagement with the bottom 5, as shown by dotted lines in Figure 2 of the drawings.

A rod indicated at 36 has connection with the rod 34, and extends rearwardly where it supports an adjustable weight 37 that normally acts to hold the forward end of the rod 34 upwardly to the end that the treadle is also held upwardly. Secured to the rod 28 is an arm 38 that is formed with an eye 39 at its upper end, embracing a portion of the elongated eye 18 formed on the rod 17 so that movement of the rod 17 will result in a relative movement of the arm 38 to accomplish the purpose of the invention.

The bait receptacle is indicated at 40 and is positioned adjacent to the treadle 35 so that it will be impossible for a rodent to inspect the bait contained therein without passing over the treadle.

An opening is formed in the upper walls of the trap and is normally closed by means of the closure 41 so that a person may have easy access to the interior of the trap to accomplish the setting thereof.

In the operation of the device, the trap is baited and set as shown by Figure 2 of the drawings. When a rodent enters the trap and endeavors to obtain access to the bait receptacle, the rodent must tread on the member 35, whereupon the member 35 moves downwardly, causing the forward end of the rod 36 to move downwardly which in turn moves the latch member to a position as shown in dotted lines in Figure 5 of the drawings, whereupon the latch member is moved out of engagement with the rearwardly extended end or right angled portions 29 of the rod 28, allowing the closure 27 to move to its closed position.

The rodent now, in an endeavor to release himself passes into the compartment 9 and onto the trap door 13 which will move to its open position under the weight of the rodent, allowing the rodent to fall down into the compartment thereunder.

With this downward movement of the trap door 13, the rod 15 is moved forwardly carrying with its rod 17, the depending end 19 of the rod moving the arm 38 forwardly, the right angled end 29 moving under the latch member 30 and onto the upper surface thereof in such a way as to hold the closure 27 in its open position and resetting the trap.

We claim:—

In a rat trap, a body portion including a front compartment and a rear compartment, a closure for normally closing the rear compartment, a closure for the front compartment, means for normally holding the last mentioned closure in its open position, said holding means including a rod connected with the last mentioned closure and adapted to extend through the body portion, an arm carried by the rod and extending upwardly therefrom, a rod having an elongated eye adapted to engage the arm, said last mentioned rod having connection with the first mentioned closure to move the rod forwardly, when the last mentioned closure moves to its open position, said arm having one end thereof bent around one portion of the elongated eye to connect the rod and arm, and said rod adapted to move the arm to its active position and open the second mentioned closure.

In testimony that we claim the foregoing as our own, we have hereto affixed our signatures.

GEORGE W. BROTHERTON.
ORLIE O. WEAVER.
NATHAN W. JOHNSON.